United States Patent
Vorobeychik et al.

(10) Patent No.: US 12,288,376 B2
(45) Date of Patent: Apr. 29, 2025

(54) SYSTEMS AND METHODS FOR DEFENDING AGAINST PHYSICAL ATTACKS ON IMAGE CLASSIFICATION

(71) Applicants: Yevgeniy Vorobeychik, St. Louis, MO (US); Tong Wu, St. Louis, MO (US); Liang Tong, St. Louis, MO (US)

(72) Inventors: Yevgeniy Vorobeychik, St. Louis, MO (US); Tong Wu, St. Louis, MO (US); Liang Tong, St. Louis, MO (US)

(73) Assignee: Washington University, St. Louis, MO (US)

( * ) Notice: Subject to any disclaimer, the term of this patent is extended or adjusted under 35 U.S.C. 154(b) by 672 days.

(21) Appl. No.: 17/214,071

(22) Filed: Mar. 26, 2021

(65) Prior Publication Data
US 2021/0300433 A1 Sep. 30, 2021

Related U.S. Application Data

(60) Provisional application No. 63/000,930, filed on Mar. 27, 2020.

(51) Int. Cl.
*G06V 10/75* (2022.01)
*B60W 60/00* (2020.01)
*G06F 18/214* (2023.01)
*G06F 18/24* (2023.01)
*G06N 3/08* (2023.01)
*G06V 10/764* (2022.01)
(Continued)

(52) U.S. Cl.
CPC ..... *G06V 10/751* (2022.01); *B60W 60/00188* (2020.02); *G06F 18/214* (2023.01); *G06F 18/24* (2023.01); *G06N 3/08* (2013.01); *G06V 10/764* (2022.01); *G06V 10/7715* (2022.01); *G06V 10/774* (2022.01); *G06V 10/82* (2022.01); *B60W 2420/403* (2013.01)

(58) Field of Classification Search
CPC ............... G06V 10/751; G06V 10/764; G06V 10/7715; G06V 10/774; G06V 10/82; B60W 60/00188; B60W 2420/403; G06F 18/213; G06F 18/214; G06F 18/24; G06N 3/08; G06N 20/00
See application file for complete search history.

(56) References Cited

U.S. PATENT DOCUMENTS 10,504,004 B2  3/2019  Kaufhold et al.
10,325,201 B1 * 6/2019  Kim ...................... G06F 18/254
(Continued)

FOREIGN PATENT DOCUMENTS

CN  109993805 A  7/2019
CN  110021049 A  7/2019

*Primary Examiner* — Solomon G Bezuayehu
(74) *Attorney, Agent, or Firm* — Armstrong Teasdale LLP

(57) ABSTRACT

An image classification system defends against physically realizable attacks. A training dataset of input images is retrieved and an adversarial image is generated based on one of the input images that is selected. The adversarial image is created by occluding a portion of the selected image by superimposing a predetermined shape (e.g., a rectangle) containing noise on the selected image. A defense against occlusion attacks (DOA) classifier is trained using the training dataset and the adversarial image. The DOA classifier is utilized to classify captured images of items (e.g., street signs) that may have been attacked (e.g., sticker placement, vandalism).

18 Claims, 17 Drawing Sheets

(51) Int. Cl.
*G06V 10/77* (2022.01)
*G06V 10/774* (2022.01)
*G06V 10/82* (2022.01)

(56) References Cited

U.S. PATENT DOCUMENTS

| | | | | |
|---|---|---|---|---|
| 10,997,470 | B2 * | 5/2021 | Ahuja | G06F 18/2193 |
| 11,017,311 | B2 * | 5/2021 | Chandler | G06N 20/00 |
| 11,686,848 | B2 * | 6/2023 | Tu | G06F 18/217 |
| | | | | 702/152 |
| 11,734,570 | B1 * | 8/2023 | Kurz | G06N 3/048 |
| | | | | 706/25 |
| 11,768,932 | B2 * | 9/2023 | Wang | G06F 21/55 |
| | | | | 382/224 |
| 2006/0122480 | A1 * | 6/2006 | Luo | G06T 7/149 |
| | | | | 600/407 |
| 2012/0170805 | A1 * | 7/2012 | Brown | G06F 18/214 |
| | | | | 382/103 |
| 2015/0310624 | A1 * | 10/2015 | Bulan | G06V 20/54 |
| | | | | 382/103 |
| 2019/0005386 | A1 | 1/2019 | Chen et al. | |
| 2019/0197358 | A1 | 6/2019 | Madani et al. | |
| 2019/0238568 | A1 * | 8/2019 | Goswami | G06F 21/566 |
| 2019/0241401 | A1 | 8/2019 | Shechtman et al. | |
| 2019/0295302 | A1 | 9/2019 | Fu et al. | |
| 2019/0318099 | A1 * | 10/2019 | Carvalho | G06F 21/577 |
| 2019/0325269 | A1 | 10/2019 | Bagherinezhad et al. | |
| 2020/0082206 | A1 * | 3/2020 | Jin | G06N 3/08 |
| 2020/0134377 | A1 * | 4/2020 | Attorre | G06V 10/82 |
| 2020/0151505 | A1 * | 5/2020 | Saito | G06F 18/214 |
| 2020/0279008 | A1 * | 9/2020 | Jain | G06F 16/954 |
| 2020/0364501 | A1 * | 11/2020 | Herz | G07G 1/0054 |
| 2020/0372301 | A1 * | 11/2020 | Kearney | G06N 3/047 |
| 2020/0372715 | A1 * | 11/2020 | Sawhney | G06T 7/75 |
| 2020/0410228 | A1 * | 12/2020 | Wang | G06N 3/04 |
| 2021/0117664 | A1 * | 4/2021 | Rizvi | G06V 30/40 |
| 2021/0152549 | A1 * | 5/2021 | Wu | G06N 3/04 |
| 2021/0241169 | A1 * | 8/2021 | Gupta | G06N 20/00 |
| 2021/0303922 | A1 * | 9/2021 | Tu | G01S 17/894 |
| 2021/0334555 | A1 * | 10/2021 | Duan | G06V 20/58 |
| 2022/0292356 | A1 * | 9/2022 | Singh | G06F 21/577 |

* cited by examiner

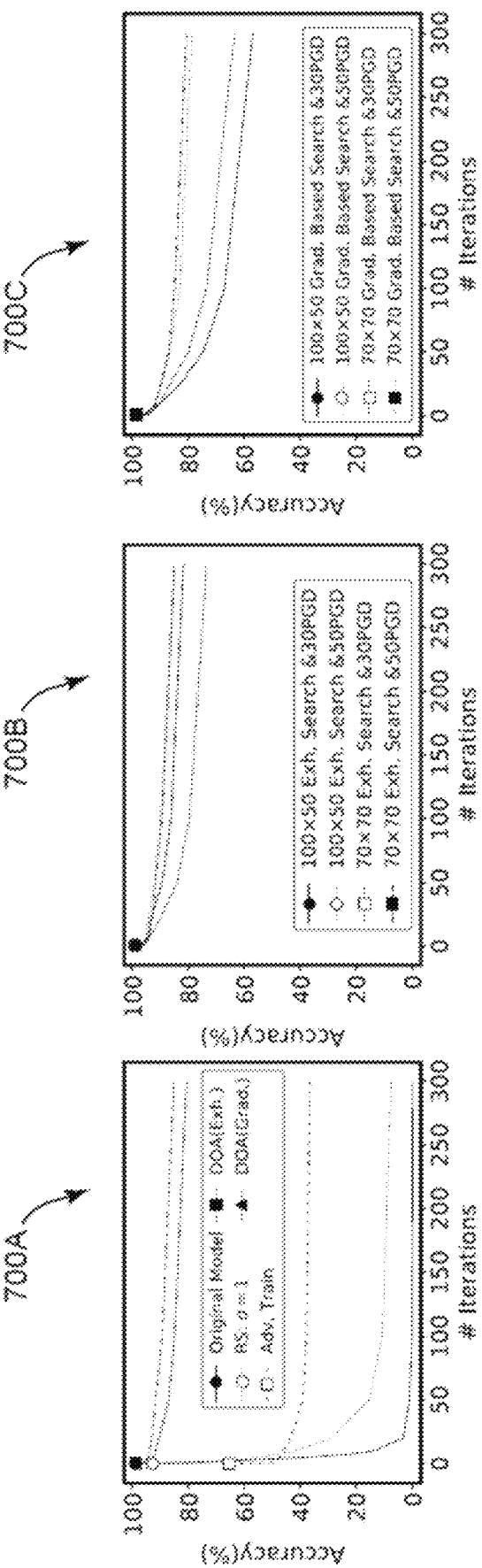

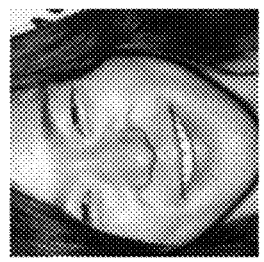
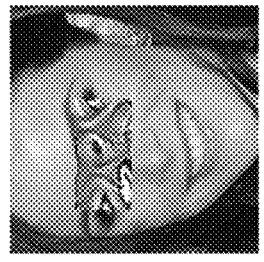
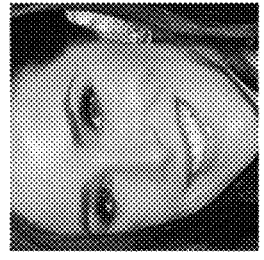
FIG. 9B
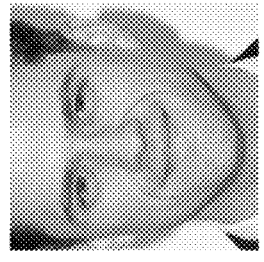
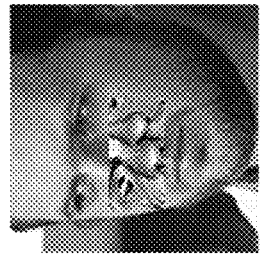
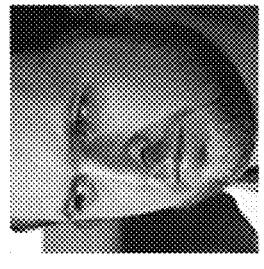
FIG. 9A

SYSTEMS AND METHODS FOR DEFENDING AGAINST PHYSICAL ATTACKS ON IMAGE CLASSIFICATION

CROSS-REFERENCE TO RELATED APPLICATIONS

This application claims the benefit of U.S. Provisional 63/000,930, filed Mar. 27, 2020, which is hereby incorporated by reference in its entirety.

STATEMENT REGARDING FEDERALLY SPONSORED RESEARCH OR DEVELOPMENT

This invention was made with government support under grants 1905558 awarded by the National Science Foundation and W911NF-19-1-0241 awarded by the Army Research Office (ARMY/ARO). The government has certain rights in this invention.

FIELD

The present disclosure relates to systems and methods for defending against physically realizable attacks, and more particularly, to systems and methods for implementing deep neural network approaches using image classification to defend against physically realizable attacks.

BACKGROUND

State-of-the-art effectiveness of deep neural networks has made it the technique of choice in a variety of fields, including computer vision, natural language processing, and speech recognition. However, deep neural networks can be easily fooled by carefully perturbing pixels in an image through what have become known as adversarial example attacks. Machine learning approaches for image classification that use deep neural networks can be extremely vulnerable to these adversarial example attacks, whereby an adversary makes unsuspicious changes to an input to fool a classifier.

Many approaches for defending deep learning in vision applications have been proposed and alternatives are often defeated soon after being proposed. The standard solution approach for this problem is an adaptation of Stochastic Gradient Descent (SGD) where gradients are either with respect to the loss at the optimal adversarial perturbation for each i (or approximation thereof, such as using heuristic local search or a convex over-approximation), or with respect to the dual of the convex relaxation of the attacker maximization problem.

Particularly concerning, however, have been a number of demonstrations that implement adversarial perturbations directly in physical objects. Rather than altering pixels in an image, such physically realizable attacks perturb a real-world object, such as by addition of stickers, patterns on eyeglasses, and the like. When the altered real-world object is subsequently captured by a camera and fed through the deep neural network classifier, the adversarial perturbations applied to the real-world object often result in the classifier misclassifying the real-world object. Many current solutions lack the ability to overcome these attacks and properly classify physical objects that have been modified by an adversary.

SUMMARY

In a first aspect, an image classification (IC) computing system comprising at least one processor in communication with a memory device may be provided. The at least one processor may be configured to: (1) retrieve, from the at least one memory device, a training dataset of one or more input images, (2) generate at least one adversarial image from a selected image from the training dataset of one or more input images by occluding a portion of the selected image by superimposing a predetermined shape containing noise on the selected image, (3) train a defense against occlusion attacks (DOA) classifier using the training dataset and the generated at least one adversarial image, and (4) store the DOA classifier in the at least one memory device. The CSP computing device may include additional, less, or alternate functionality, including that discussed elsewhere herein.

In another aspect, a method for defending against physically realizable attacks is provided. The computer implemented method may include: (1) receiving a training dataset of one or more input images, (2) generating at least one adversarial image from a selected image from the training dataset of one or more input images by occluding a portion of the selected image by superimposing a predetermined shape containing noise on the selected image, (3) training a defense against occlusion attacks (DOA) classifier using the training dataset and the generated at least one adversarial image, and (4) storing the DOA classifier in least one memory device. The method may include additional, less, or alternate steps, including that discussed elsewhere herein.

In yet another aspect, a computer-readable media storing non-transitory instructions is provided. The non-transitory instructions, when executed by a processor, cause the at least one processor to: (1) receive a training dataset of one or more input images, (2) generate at least one adversarial image from a selected image from the training dataset of one or more input images by occluding a portion of the selected image by superimposing a predetermined shape containing noise on the selected image, (3) train a defense against occlusion attacks (DOA) classifier using the training dataset and the generated at least one adversarial image, and (4) store the DOA classifier in least one memory device. The instructions may cause additional, less, or alternative functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 4A and 4B illustrate exemplary physically realizable attacks in accordance with one or more embodiments of the present invention.

FIGS. 7A, 7B and 7C illustrate exemplary performance of defense against occlusion attacks (DOA) against at least one type of physically realizable attack in comparison to conventional methods.

FIGS. 9A and 9B illustrate examples of an ROA attack on a face recognition in accordance with one or more embodiments of the disclosure.

Figure 1:
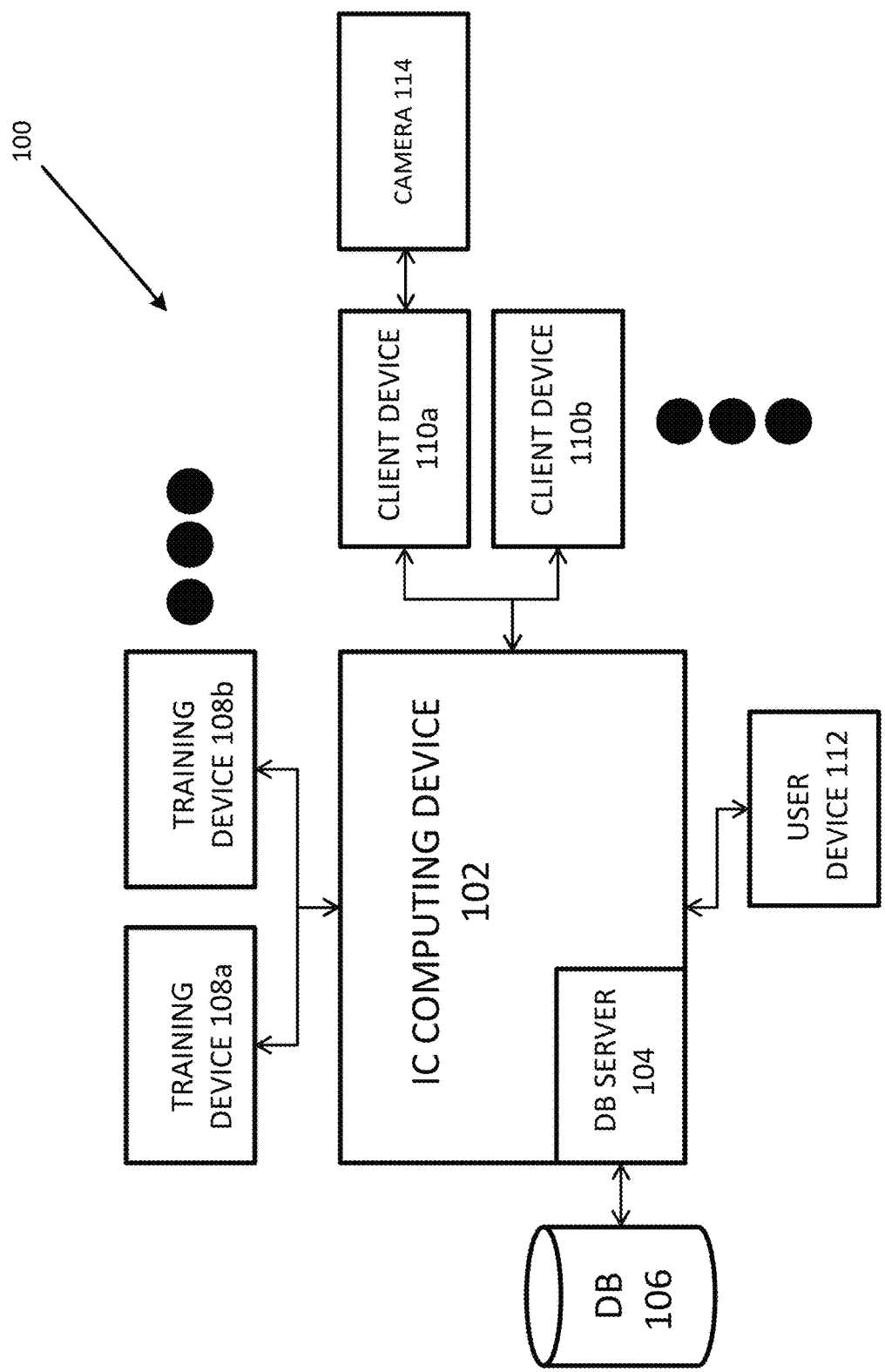
FIG. 1 illustrates an exemplary image classification (IC) system in accordance with an exemplary embodiment of the present invention.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

There are many uses of deep neural networks in image classification, including autonomous driving and surveillance, in which safety and security are critical concerns, with inputs potentially corrupted by malicious parties. Known deep neural networks based methods for image classification are highly vulnerable to these inputs. The method and system of image classification described herein for adversarial-training deep neural networks may reduce vulnerabilities in broad classes of realistic attacks and improve defending deep neural network approaches for image classification from physically realizable attacks.

In some exemplary embodiments, systems and methods are provided herein for defending deep neural networks against adversarial attacks, such as through techniques for learning more robust neural network models, or by detecting adversarial inputs. The adversarial attacks are physical attacks (also referred to as physically realizable attacks), where the adversary makes small modifications to physical objects, such as posting innocuous-looking stickers on stop signs, with the result that deep neural networks not trained in accordance with this disclosure are likely to misclassify the object, such as misclassifying the stop sign as a speed limit sign. Further examples of such physical attacks on deep neural networks may include attacks which fool facial recognition by using adversarially designed eyeglass frames, and attacks which tricks street sign classification by adding adversarially crafted stickers. In another example, an universal adversarial patch attack causes targeted misclassification of any object with the adversarially designed sticker (patch) attached thereto when the object and the patch are captured in an image and input to a classifier. While considerable attention has been devoted to defending against adversarial perturbation attacks in the digital space (e.g., pixel level perturbation of digital images that cause the perturbed images to be misclassified), there are no known and effective methods specifically to defend against such physical attacks.

Described herein is a system and method of image classification with an image classification computing device for making deep neural networks significantly more robust to physical attacks that involve small-size occlusions, such as stickers on traffic signs, human faces, etc. The method relies on an algorithmic adversarial training procedure in which adversarial occlusions of a given shape are iteratively introduced into training data, thus resulting in highly robust models. In some embodiments, the given shape is a rectangle. In other embodiments, the given shape is any other suitable shape, such as a circle, oval, square, or the like.

The image classification system and method described herein demonstrates scalability and effectiveness for learning robust models by adversarial training with Projected Gradient Descent (PGD) attacks and randomized smoothing which exhibit very limited effectiveness against three of the highest profile physical attacks. The system and method include a new abstract adversarial model and rectangular occlusion attacks, in which an adversary places a small adversarial-crafted rectangle in an image. The system and method further include approaches for efficiently computing the resulting adversarial examples. The system and method further includes demonstrating that adversarial training using the new attack yields image classification models that exhibit high robustness against physically realizable attacks, thus offering the first effective generic defense against such attacks.

Exemplary System for Defending Against Physically Realizable Attacks on Image Classification FIG. 1 depicts an exemplary Image Classification (IC) system 100. IC system 100 includes an IC computing device 102. IC computing device 102 includes a database server 104 and is in communication with, for example, a database 106, one or more training devices 108a and 108b, one or more client devices 110a and 110b and user device 112. Devices 108a, 108b, 110a, 110b and 112 may be, for example, mobile devices, tablet PCs, portable computers, or the like. In some embodiments, IC computing device 102 may be associated with, for example, a defender providing defense against physically realizable attacks associated with, for example, user devices 112. In some embodiments, the IC computing device 102 is part of one of the client devices 110a, 110b, or part of one of the training devices 108a, 108b.

IC computing device 102 receives one or more input images to create an abstract model of adversarial occlusions, for example. A typical user device, or client device, includes components for capturing or receiving input image data and modeling the input image data. Additionally, or alternatively, the input image data may be training data for creating a robust classification model. For example, the input image data may include adversarial training data, described further herein. In some embodiments, an image may include a fixed-dimension rectangular shape, or other like shape, that, in some embodiments, may be used by an attacker to attempt to disrupt an image classification process. In some embodiments, an attacker may use an object of a certain shape, such as a sticker or patch, in an attempt to obfuscate a portion of an object, such as a road sign, or the like. IC computing device 102 may use this input data to develop training data for an image classification model. The input image data, which may include adversarial training data and non-adversarial training data, and trained model datasets may be stored on a data storage device or in a database, such as database 104 or database 106, for example. Database 104 may be implemented as a local storage option. Alternatively, database 104 may be a remote storage location, such as a cloud storage option.

Devices 108a, 108b, 110a, 110b and 112 may be equipped with, for example, image capturing devices, such as a camera or other like sensors. The image capturing device may be used to capture object data, such as exemplary items typically captured by camera-equipped vehicles. Such items may include, but is not limited to road signs, crosswalks, landmarks, traffic signals, or the like. Other object data may be human faces or animal faces, or the like.

In some embodiments, IC computing device 102 classifies one or more images captured by an image capturing device, such as a camera attached to or associated with a client device. For example, IC computing device 102 may receive an image for classification from one or more client devices 110. In some embodiments, the received image may be partially occluded by an object, such as a sticker, a patch, or a pair of eyeglasses, for example. Using the image classification model built using the adversarial training dataset, the IC computing device may properly classify the occluded image. Additionally, or alternatively, user feedback may be provided with respect to image classification accuracy. Based on the user feedback, the image classification model may be updated dynamically and improved over time. In other embodiments, the classification model built as described herein using the adversarial dataset may be trained and built using the IC computing device 102, and provided to the client devices, with the client devices then using the adversarially trained image classification model to classify images captured by the client device.

In some embodiments, the IC computing device 102 may include an image classification system for defending against physical attacks. The computing device 102 may be communicatively coupled to an image capture device, such as camera 114, via client device 110a, for example. IC computing device 102 may, in some embodiments, receive image data from camera 114. Additionally, or alternatively, computing device 102 may control operation of camera 114 to capture an image of a certain object, such as a street sign, a face, or the like. Even further, IC computing device 102 may be integrated into camera 114, while in other embodiments, IC computing device 102 may be located remote from camera 114.

Exemplary Computing Device

Figure 2:
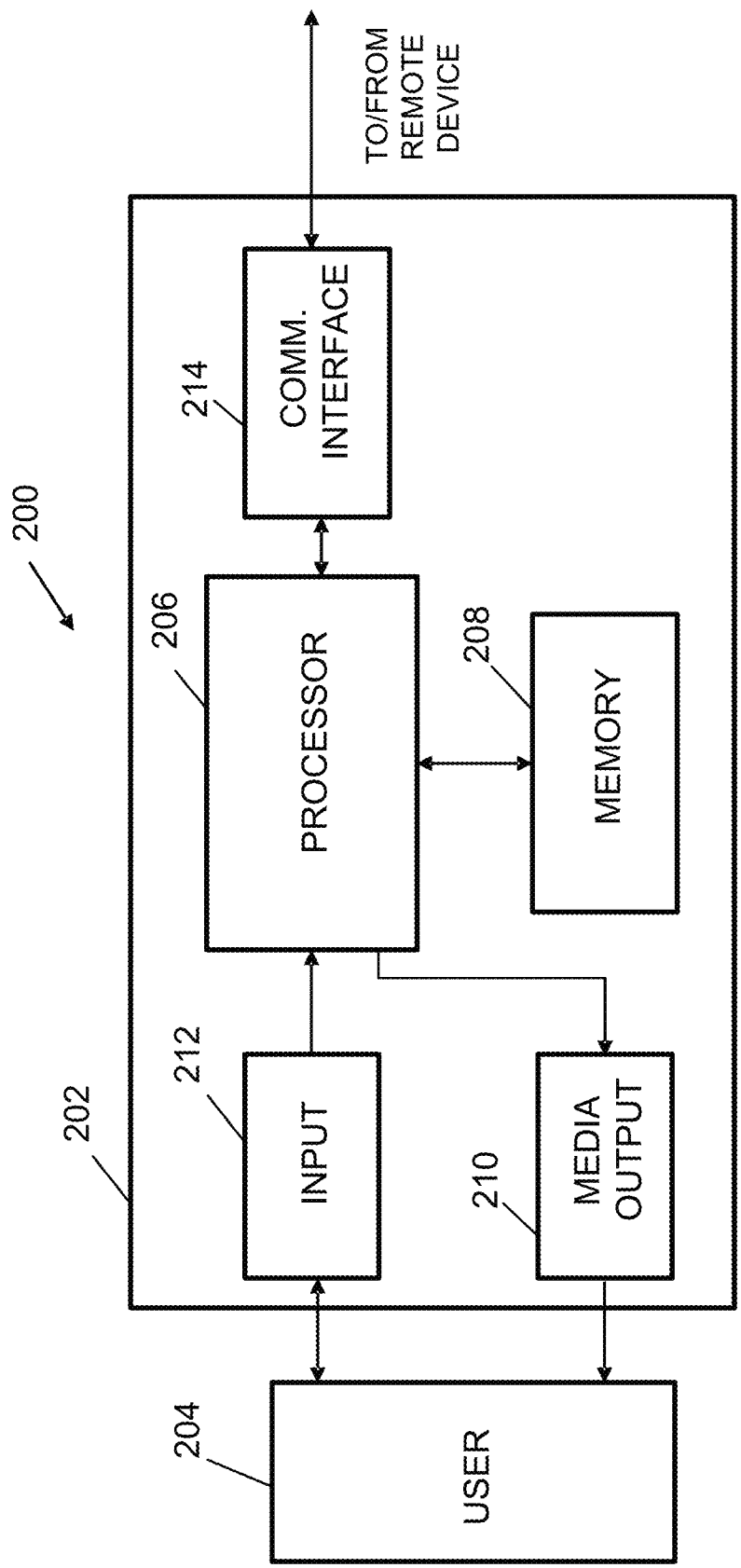
FIG. 2 illustrates an exemplary client computing device that may be used with the IC system illustrated in FIG. 1.

FIG. 2 illustrates diagram 200 of an example computing device 202 for use as the computing device shown in FIG. 1 or that may be a separate computing device for training a neural network for use in the system of FIG. 1. The computing device 202 includes a processor 206, a memory 208, a media output component 210, an input device 212, and a communications interface 214. Other embodiments include different components, additional components, and/or do not include all components shown in FIG. 2.

Computing device 202 includes a processor 206 for executing instructions. In some embodiments, executable instructions may be stored in a memory area 208. Processor 206 may include one or more processing units (e.g., in a multi-core configuration). Memory area 208 may be any device allowing information such as executable instructions and/or other data to be stored and retrieved. Memory area 208 may include one or more computer readable media.

In the example embodiment, computing device 202 includes a media output component 210 for presenting information to a user, such as user 204. Media output component 210 may be any component capable of conveying information to user 204. In some embodiments, media output component 210 may include an output adapter such as a video adapter and/or an audio adapter. An output adapter may be operatively coupled to processor 206 and operatively coupled to an output device such as a display device (e.g., a liquid crystal display (LCD), a light emitting diode (LED) display, an organic light emitting diode (OLED) display, a cathode ray tube (CRT) display, an "electronic ink" display, a projected display, etc.) or an audio output device (e.g., a speaker arrangement or headphones). Media output component 210 may be configured to, for example, display a status of the model. In another embodiment, media output component 210 may be configured to, for example, display a result of an image classification process.

Computing device 202 also includes an input device 212 for receiving input from user 204. Input device 212 may include, for example, a keyboard, a pointing device, a mouse, a stylus, a touch sensitive panel (e.g., a touch pad or a touch screen), or an audio input device. A single component, such as a touch screen, may function as both an output device of media output component 210 and an input device of input device 212.

Computing device 202 also includes a communication interface 214, which can be communicatively coupled to a remote device, such as IC computing device 102 of FIG. 1. Communication interface 214 may include, for example, a wired or wireless network adapter or a wireless data transceiver for use with a mobile phone network (e.g., Global System for Mobile communications (GSM), 3G, 4G, or Bluetooth) or other mobile data networks (e.g., Worldwide Interoperability for Microwave Access (WIMAX)). The systems and methods disclosed herein are not limited to any certain type of short-range or long-range networks.

Stored in memory area 208 may be, for example, non-transitory computer readable instructions that cause to processor to perform actions as described herein. That is, the instructions configure the computing device to perform the operations described herein. For example, the instructions stored in the memory 208 may cause the processor to adversarially train a classifier, use a trained classifier to classify images, and the like. In some embodiments, the memory area 208 may include instructions that cause the processor to provide a user interface to user 204 via media output component 210 and, optionally, receiving and processing input from input device 212. A user interface may include, among other possibilities, a web browser or a client application. Web browsers may enable users, such as user 204, to display and interact with media and other information typically embedded on a web page or a website.

Memory area 208 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAN). The above memory types are example only, and are thus not limiting as to the types of memory usable for storage of a computer program.

Example Server Computing Device

Figure 3:
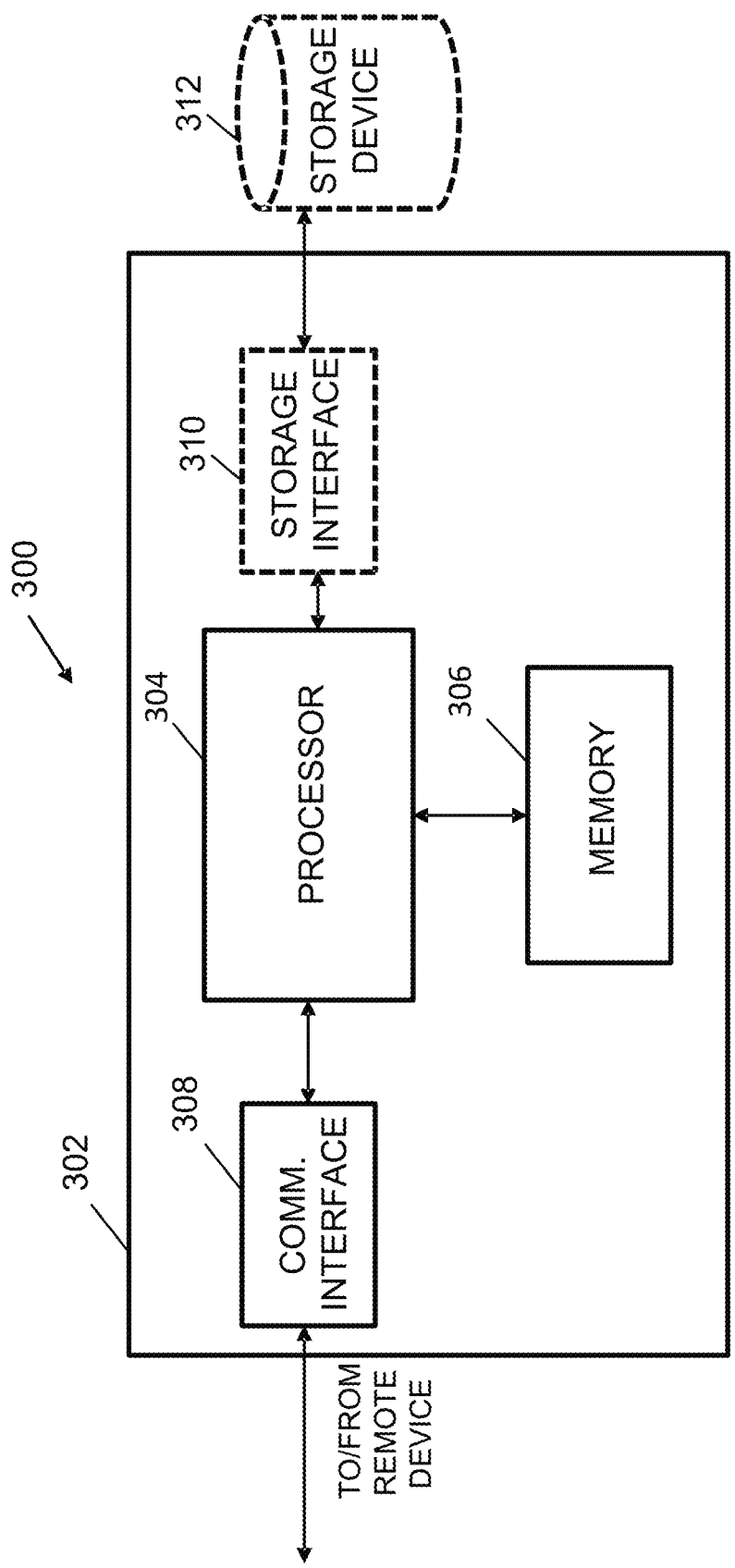
FIG. 3 illustrates an exemplary server system that may be used with the IC system illustrated in FIG. 1.

FIG. 3 is a block diagram 300 of an example server system 302 that may be used with IC computing system 100 illustrated in FIG. 1. Server system 302 may be, for example, server device 104 (shown in FIG. 1).

In example embodiments, server system 302 includes a processor 304 for executing instructions. Instructions may be stored in a memory area 306. Processor 304 may include one or more processing units (e.g., in a multi-core configuration) for executing the instructions. The instructions may be executed within a variety of different operating systems on server system 302, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, python, or other suitable programming languages, etc.).

Processor 304 is be operatively coupled to a communication interface 308 such that server system 302 is capable of communicating with IC computing device 102, training devices 108a or 108b, client devices 110a or 110b, or user device 112 (all shown in FIG. 1), and/or another server system, for example. In some embodiments, communication interface 308 may receive data from training device 108a and/or user device 112 via the Internet.

Processor 304 may also be operatively coupled to a storage device 312, such as database 106 (shown in FIG. 1). Storage device 312 may be any computer-operated hardware suitable for storing and/or retrieving data. In some embodiments, storage device 312 may be integrated in server system 302. For example, server system 302 may include one or more hard disk drives as storage device 312. In other embodiments, storage device 312 may be external to server system 302 and may be accessed by a plurality of server systems. For example, storage device 312 may include multiple storage units such as hard disks or solid state disks in a redundant array of inexpensive disks (RAID) configuration. Storage device 312 may include a storage area network (SAN) and/or a network attached storage (NAS) system.

In some embodiments, processor 304 is operatively coupled to storage device 312 via a storage interface 310. Storage interface 310 may be any component capable of providing processor 304 with access to storage device 312. Storage interface 310 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 304 with access to storage device 312.

Memory area 306 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer system.

Example Physically Realizable Attacks

In some embodiments, a system, such as IC computing system 100, is used to defend deep neural network approaches for image classification from physically realizable attacks. For example, two scalable and effective methods for learning robust models include adversarial training with projected gradient descent (PGD) attacks and randomized smoothing. Additionally, or alternatively an adversarial model may be used in defending against physically realizable attacks. For example, an attack may be classified as a rectangular occlusion attack (ROA). In an ROA, an attacker, or adversary, may place a small adversarial-crafted rectangle in an image. It is understood that a rectangle shape is merely illustrative and not meant to be limiting. Other occlusive shapes may be implemented without departing from the spirit and scope of the disclosure. To handle an ROA, adversarial training of a model may be conducted to efficiently compute instances of ROA. In some embodiments, adversarial training yields image classification models that exhibit high robustness against physically realizable attacks.

The example systems and methods for defending deep neural networks against adversarial examples typically utilize either techniques for learning more robust neural network models, or by detecting adversarial inputs. These example attacks may be physical attacks (also referred to as physically realizable attacks), where the adversary makes small modifications to physical objects, such as posting innocuous-looking stickers on stop signs, with the result that deep neural networks misclassify the object, such as misclassifying a stop sign as a speed limit sign. In other examples, physical attacks on deep neural networks may include attacks which fool facial recognition by using adversarially designed eyeglass frames, attacks which fool stop sign classification by adding adversarially crafted stickers, or a universal adversarial patch attack, which attempts to cause misclassification of any object with the adversarially designed sticker or patch. Systems and methods are described herein to defend against such physical attacks.

Examples will be described herein with reference primarily to two types of physically realizable attacks: 1) an eyeglass frame attack on face recognition; and 2) a sticker attack on stop signs, but the methods and systems described herein may be used to defend against other types of physically realizable attacks. An empirical evaluation of the effectiveness of conventional approaches to robust machine learning (ML) against the two types of physically realizable attacks will be described to contrast with the effectiveness of the novel methods and systems of this disclosure. Described further is an abstract attack model which directly captures the nature of common physically realizable attacks. Specifically, a simple class of rectangular occlusion attacks in which the attacker places an item, such as a rectangular sticker, onto an image, with both the location and the content of the sticker adversarially chosen. In some embodiments, an algorithm may be used to compute such adversarial occlusions. Additionally, adversarial training may be utilized to obtain neural network models. Further, an extensive evaluation may be utilized to demonstrate the robustness against physical attacks on deep neural networks.

Adversarial Examples

Adversarial example attacks on deep learning for image classification have demonstrated that adversarial perturbations that are essentially invisible to the human eye can cause systematic misclassification by at least some known state-of-the-art neural networks. In some embodiments, the focus is on algorithmic approaches for identifying a perturbation $\delta$ to add to an original input image x to cause a misclassification while remaining "unsuspicious", where suspiciousness is quantified by an lp-norm constraint on the magnitude of $\delta$. The typical goal is to solve an associated optimization problem, a prototypical example of which is the following:

$$\underset{\delta}{\operatorname{argmax}} L(f(x+\delta:\theta), y) \text{ s.t.} \|\delta\|_p \leq \epsilon, \tag{1}$$

where L(•) is the adversary's utility function (for example, the adversary may wish to maximize the cross-entropy loss).

Systems and methods described herein include, inter alia, a focus on a class of physical attacks which may entail modifying the actual object being photographed in order to fool a neural network that subsequently takes its digital representation as input. The attacks may include three characteristics: 1) the attack can be implemented in the physical space (e.g., modifying the stop sign, wearing specifically designed eyeglasses, applying a patch or sticker to an object, etc.); 2) the attack has low suspiciousness; this is operationalized by modifying only a small part of the object, with the modification similar to common "noise" that obtains in the real world; for example, stickers on a stop sign would appear to most people as vandalism, but covering the stop sign with a printed poster would look highly suspicious; and 3) the attack causes misclassification by state-of-the-art deep neural network for the relevant domain.

Systems and methods described herein may refer to attacks as physically realizable attacks, to allude to the fact that it is possible to realize them in practice. It is evident that physically realizable attacks represent a somewhat stronger adversarial model than their actual implementation in the physical space. Henceforth, for simplicity, the terms physical attacks and physically realizable attacks may be used interchangeably.

Described herein are three example physically realizable attacks. The first is the attack on face recognition, in which the attacker adds adversarial noise inside printed eyeglass frames that can subsequently be put on to fool a deep neural network not trained in accordance with this disclosure. The second attack posts adversarially crafted stickers on a stop sign to cause it to be misclassified by known classifiers as another road sign, such as the speed limit sign. The third, adversarial patch, attack designs a patch (a sticker) with adversarial noise that can be placed onto an arbitrary object, causing that object to be misclassified by a deep neural network not trained as described herein. FIG. 4A illustrates an example of an eyeglass frame attack. In the first panel, an original face input image is shown. In the second panel, a modified input image (adversarial eyeglasses superimposed on the face) is shown. In the third and final panel, an image of the predicted individual output by a known neural network classifier in response to the input of the middle image is shown. FIG. 4B illustrates an example of a stop sign attack. In the first panel, an original stop sign input image is shown. In the second panel, an adversarial mask is shown. In the third and final panel, a stop sign image with the adversarial stickers from the adversarial mask, classified as a speed limit sign, is shown.

Robust deep learning techniques may, in some instances, be overcome by more sophisticated attacks. Known approaches for defense typically fall into two broad categories, robust learning and randomized smoothing. At least one goal of robust learning includes the minimization of a robust loss. This may be defined using the following equation:

$$\theta^* = \underset{\theta}{\operatorname{argmin}} \, \mathbb{E}_{(x,y)\sim\mathcal{D}} \left[ \max_{\|\delta\|_p \leq \epsilon} L(f(x+\delta;\theta), y) \right], \tag{2}$$

where D denotes the training data set. In practice, the adversarial training approach may use the PGD attack as an approximation to the inner optimization problem, and then take gradient descent steps with respect to the associated adversarial inputs. Additionally, or alternatively, a modified version of this approach termed curriculum adversarial training may be implemented. An example implementation of this approach proceeds as follows: first, apply adversarial training for a small E, then increase $\epsilon$ and repeat adversarial training, and so on, increasing $\epsilon$ until a desired level of adversarial noise is reached to be robust to.

With respect to randomized smoothing a second class of techniques may include adding noise to inputs at both training and prediction time. A smoothed classifier g (•) may be constructed from a base classifier f(•) by perturbing the input x with isotropic Gaussian noise with variance If. The prediction is then made by choosing a class with the highest probability measure with respect to the induced distribution of f(•) decisions:

$$g(x) = \underset{c}{\operatorname{argmax}} P(f(x+\sigma) = c), \sigma \sim \mathcal{N}(0, \sigma^2 I). \tag{3}$$

In this example, a provably robust classification in this manner may be implemented by training the classifier f(•) by adding Gaussian noise to inputs at training time.

In some systems, approaches for endowing deep learning with adversarial robustness focus on adversarial models in which the attacker introduces lp-bounded adversarial perturbations over the entire input. As set forth above, two representative approaches in this vein: adversarial training, commonly focused on robustness against l∞ attacks, and randomized smoothing, which is most effective against l2 attacks (although certification bounds can be extended to other lp norms as well).

Figures 5A, 5B, 5C:
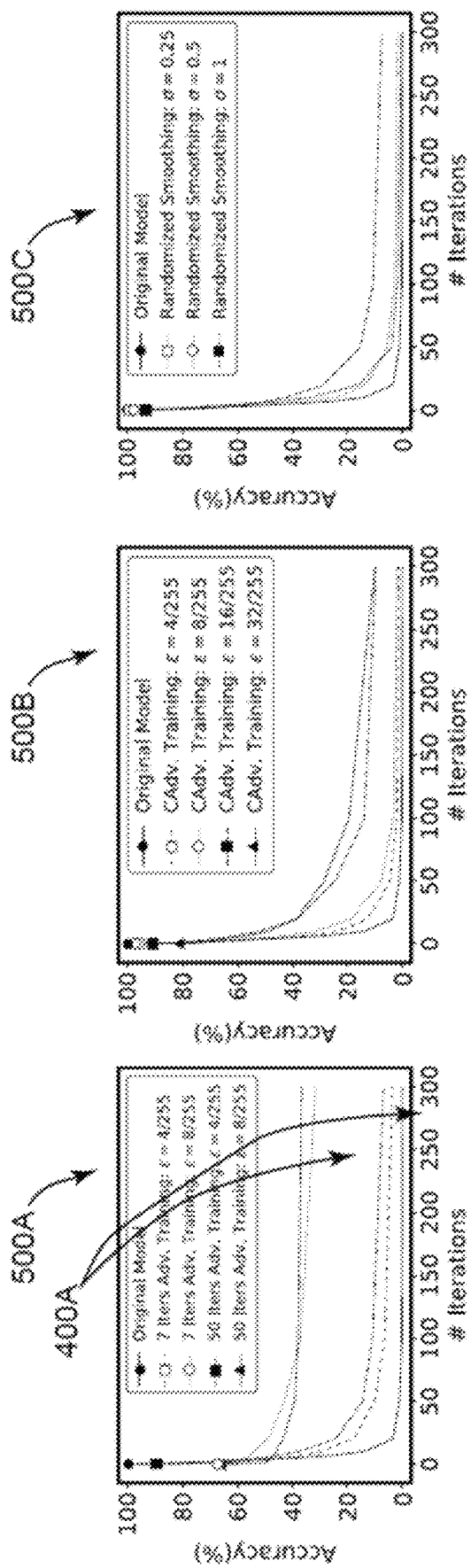
FIGS. 5A, 5B and 5C illustrate exemplary performance of adversarial training, curriculum adversarial training and randomized smoothing against at least one example of a physically realizable attack.

FIG. 5 illustrates the results of classifiers obtained from adversarial training (FIG. 5A) as well as curriculum adversarial training (FIG. 5B), in terms of accuracy (after the attack) as a function of the number of iterations of an eyeglass frame attack. As shown in FIG. 5, none of the variations of adversarial training are particularly effective once the number of physical attack iterations is above 20. The best performance in terms of adversarial robustness is achieved by adversarial training with $\epsilon = 8$, for approaches using either 7 or 50 PGD iterations (the difference between these appears negligible). However, non-adversarial accuracy for these models is below 70%, a ~20% drop in accuracy compared to the original model. Moreover, adversarial accuracy is under 40% for sufficiently strong physical attacks. Curriculum adversarial training generally achieves significantly higher non-adversarial accuracy, but is far less robust, even when trained with PGD attacks that use $\in=32$.

FIG. 5C shows the performance of randomized smoothing when faced with the eyeglass frames attack. It is readily apparent that randomized smoothing is ineffective at deflecting this physical attack: even as the amount of noise added is varied, accuracy after attacks is below 20% even for relatively weak attacks, and often drops to nearly 0 for sufficiently strong attacks.

Figures 6A, 6B, 6C:
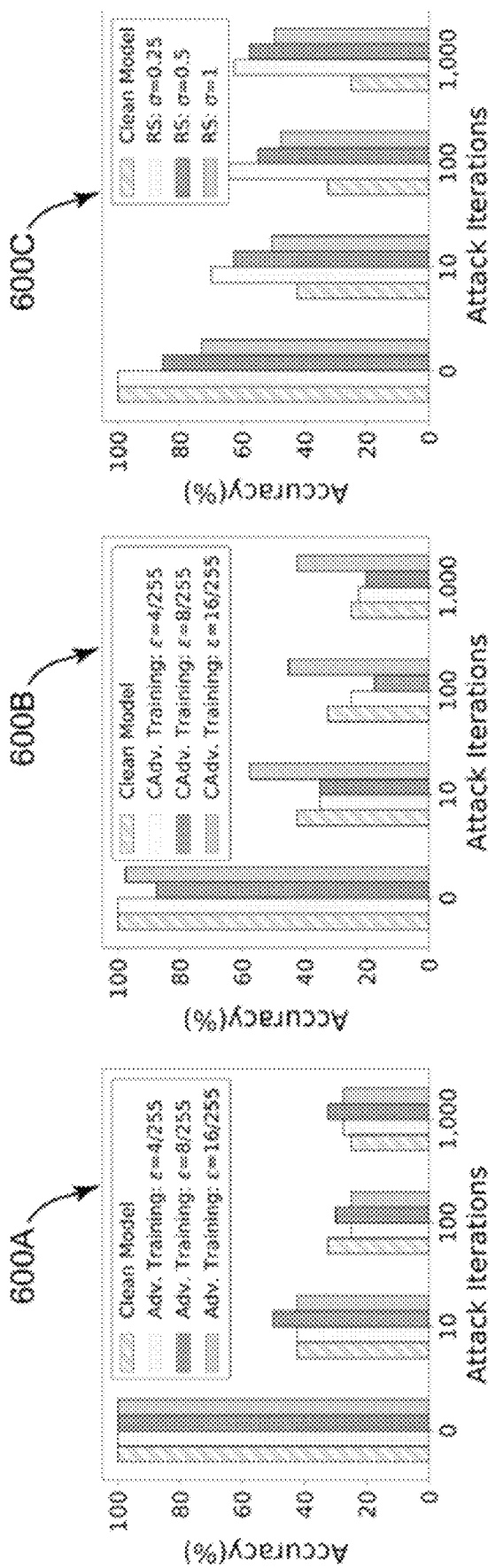
FIGS. 6A, 6B and 6C illustrate exemplary performance of adversarial training, curriculum adversarial training and randomized smoothing against at least one other example of a physically realizable attack.

FIG. 6 illustrates performance of adversarial training (FIG. 6A), curriculum adversarial training (with 7 PGD iterations) (FIG. 6B), and randomized smoothing (FIG. 6C) against the stop sign attack. In this case, both the original and curriculum versions of adversarial training with PGD are ineffective when $\in=32$ (error rates on clean data are above 90%); these are consequently omitted from the plots. Curriculum adversarial training with $\in=16$ has the best performance on adversarial data, and works well on clean data. Most variants of adversarial training perform at best marginally better than the original model against the stop sign attack. Even the best variant has relatively poor performance, with robust accuracy under 50% for stronger attacks.

The right panel of FIG. 3 (right) presents the results for randomized smoothing. In this example, randomized smoothing performs inconsistently. To address this, 5 random seeds were used to repeat the experiments, and the resulting mean values are used in the final results. Here, the best variant uses $\sigma=0.25$, and, unlike experiments with the eyeglass frame attack, significantly outperforms adversarial training, reaching accuracy slightly above 60% even for the stronger attacks. Nevertheless, even randomized smoothing results in significant degradation of effectiveness on adversarial instances (nearly 40%, compared to clean data).

Defense Against Occlusion Attacks (DOA)

The key common element in these attacks, and many other physical attacks, is that they involve the introduction of adversarial occlusions to a part of the input to be classified. The common constraint faced in such attacks is to avoid being suspicious, which effectively limits the size of the adversarial occlusion, but not necessarily its shape or location. Systems and methods described herein provide a simple abstract model of occlusion attacks, how such attacks can be computed, and how classifiers are made robust to them.

Systems and methods described herein provide simple abstract model of adversarial occlusions of input images. The attacker introduces a fixed-dimension rectangle, for example. This rectangle may be placed by the adversary anywhere in the image, and the attacker can furthermore introduce l∞ noise inside the rectangle with an exogenously specified high bound $\in$ (for example, $\in=255$, which effectively allows addition of arbitrary adversarial noise). This model bears some similarity to l0 attacks, but the rectangle imposes a contiguity constraint, which reflects common physical limitations. In practice, for example, adversarial occlusions need not be rectangular or have fixed dimensions (for example, the eyeglass frame attack is clearly not rectangular), but at the same time cannot usually be arbitrarily superimposed on an image, as they are implemented in the physical environment. Nevertheless, the model reflects some of the most important aspects common to many physical attacks, such as stickers placed on an adversarially chosen portion of the object we wish to identify. In at least one embodiment, a feature of the attack is that it is untargeted: since the ultimate goal is to defend against physical attacks, untargeted attacks that aim to maximize error are the most useful. In other embodiments, the occlusion may have any other shape, such as a circle, an oval, a hexagon, or the like.

An ROA attack is easier to compute than other attacks, such as l∞-bounded attacks, because fine-grained adversarial perturbations are restricted to a small region. In addition, only a single place for this region in an image is needed to be detected. The latter task may be done by an exhaustive search: consider all possible locations for the upper left-hand corner of the rectangle, compute adversarial noise inside the rectangle using PGD for each of these, and choose the worst-case attack (i.e., the attack which maximizes loss computed on the resulting image). However, this approach would be extremely slow, since PGD would need to be performed inside the rectangle for every possible position. In at least one embodiment, these two tasks may be decoupled. More specifically, an exhaustive search using a grey rectangle to find a position for it that maximizes loss may be performed. Subsequently, fix the position and apply PGD inside the rectangle.

An exhaustive search approach for ROA location necessitates computations of the loss function for every possible location, which requires full forward propagation each time. Thus, the search itself may be relatively slow. To speed the process up further, the gradient of the input image to identify candidate locations may be used. Specifically, a subset of C locations for the sticker with the highest magnitude of the gradient may be selected, and only exhaustively search among these C locations. C may be exogenously specified to be small relative to the number of pixels in the image, which may significantly limit the number of loss function evaluations.

Once an ROA attack is computed, defense against ROA may be implemented. For example, a standard adversarial training approach for defense may be applied. In some embodiments, the resulting classifiers robust to the adversarial occlusion attacks may be referred to as Defense against Occlusion Attacks (DOA).

FIGS. 7A, 7B and 7C illustrate exemplary performance of DOA (using a 100×50 rectangle) against an eyeglass frame attack in comparison with conventional methods. FIG. 7A illustrates a comparison between DOA, adversarial training, and randomized smoothing (using the most robust variants of these). FIGS. 7B and 7C illustrate comparing DOA performance for different rectangle dimensions and numbers of PGD iterations inside the rectangle. FIG. 7B illustrates using exhaustive search for ROA. FIG. 7C illustrates using the gradient-based heuristic for ROA.

FIGS. 7A, 7B and 7C show the results from training using occlusive rectangles of two different dimensions having comparable areas. Specifically, the occlusive rectangles had dimensions of 100×50 and 70×70, both in pixels. The images used for the training were approximately 224×224 pixels. Thus, the rectangles occupy approximately 10% face images. Shown is the use of {30, 50} iterations of PGD with $\in=255/2$ to generate adversarial noise inside the rectangle, and with learning rate $\alpha=\{8, 4\}$ correspondingly. For the gradient version of ROA, C=30 is shown. DOA adversarial training may be performed for 5 epochs with a learning rate of 0.0001.

FIG. 7A illustrates results comparing the effectiveness of DOA against the eyeglass frame attack on face recognition to adversarial training and randomized smoothing (taking the most robust variants of both of these). It is shown that DOA yields significantly more robust classifiers for this domain. The gradient-based heuristic does come at some cost, with performance slightly worse than when using exhaustive search, but this performance drop is relatively small, and the result is still far better than conventional robust ML approaches. FIGS. 7B and 7C compare the performance of DOA between two rectangle variants with different dimensions. It is shown that as long as enough iterations of PGD are used inside the rectangle, changing its dimensions (keeping the area roughly constant) appears to have minimal impact.

Figures 8A, 8B:
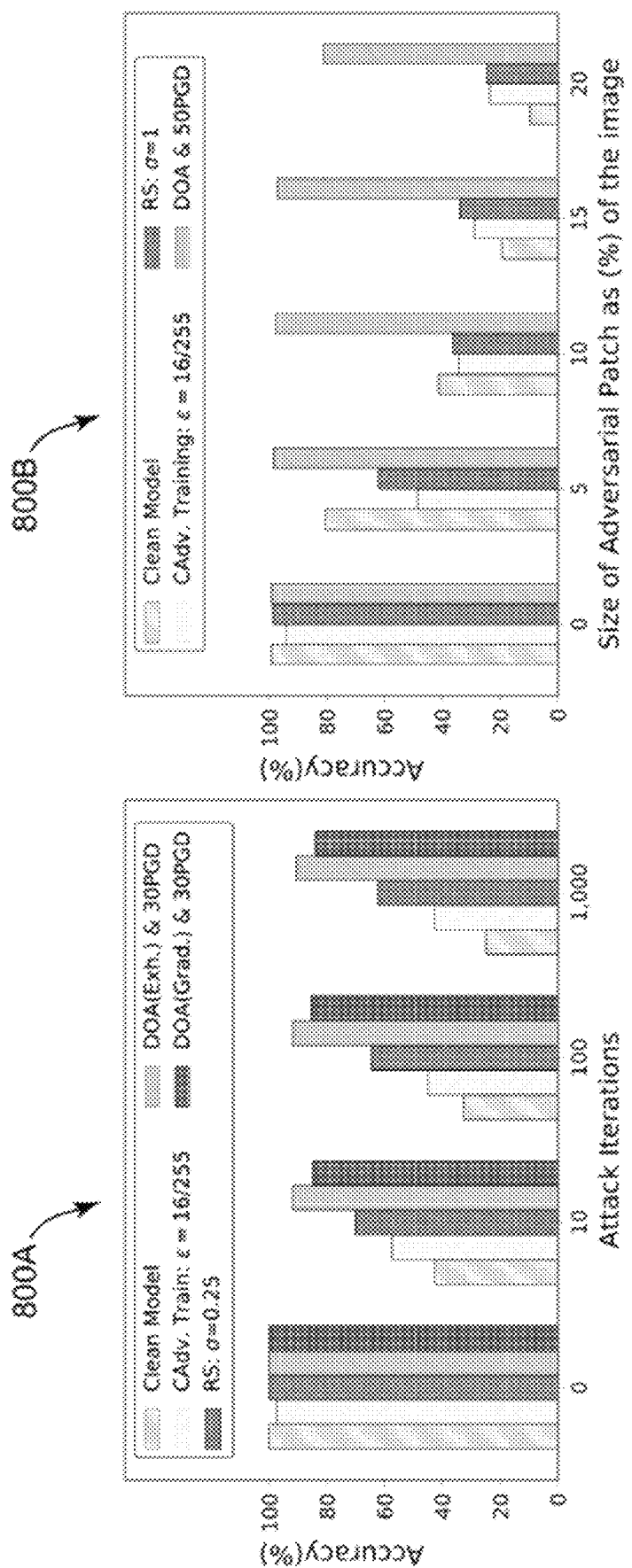
FIGS. 8A and 8B illustrate exemplary performance of adversarial training, randomized smoothing and DOA against different types of physically realizable attacks.

FIGS. 8A and 8B illustrate the results of application of DOA against a stop sign attack and a patch attack. In this example, 10×5 and 7×7 (pixels) rectangles covering ~5% of the 32×32 stop sign images were used. In this example, C is set as C=10 for the gradient-based ROA. Implementation of DOA is otherwise identical as in the face recognition experiments above. In this example, results are shown using the square rectangle, which in this case was shown to be more effective. In other embodiments, other shapes may be used. FIG. 8A compares the effectiveness of DOA against the stop sign attack on traffic sign data with the best variants of adversarial training and randomized smoothing. The results shown are for 30 iterations of PGD. It is shown that DOA is again significantly more robust, with robust accuracy over 90% for the exhaustive search variant, and ~85% for the gradient-based variant, even for stronger attacks. Moreover, DOA remains 100% effective at classifying stop signs on clean data, and exhibits ~95% accuracy on the full traffic sign classification task.

FIG. 8B illustrates evaluation results of DOA against adversarial patch attacks. In these attacks, an adversarial patch (e.g., sticker) is designed to be placed on an object with the goal of inducing a misclassification. This type of attack may occur in both face recognition and traffic sign classification tasks. FIG. 8B illustrates the results for face recognition. As illustrated by FIG. 8B, adversarial patch attacks are quite effective once the attack region (fraction of the image) is 10% or higher, with adversarial training and randomized smoothing both performing rather poorly. In contrast, DOA remains highly robust even when the adversarial patch covers 20% of the image.

FIGS. 9A and 9B illustrate examples of an ROA attack on a facial recognition in accordance with one or more embodiments of the disclosure. In this example a rectangle of size 100×50 is used. In FIG. 9A, the first panel shows the original image of A. J. Buckley, the second panel shows a modified input image (ROA superimposed on the face), and the third panel shows an image of the predicted individual (who is Aaron Tveit) that is output by a classifier not trained according to this disclosure when the adversarial input in the middle image is classified. In FIG. 9B, the first panel shows an image of Abigail Spencer, the second panel shows a modified input image (ROA superimposed on the face), and the third panel shows an image of the predicted individual (Aaron Yoo) that is output by a classifier not trained according to this disclosure when the adversarial input in the middle image is classified.

FIGS. 9A and 9B provides several examples of the ROA attack in the context of facial recognition. In these examples, the adversaries chose to occlude the noise on upper lip and eye areas of the image, therefore making the face more challenging to recognize even to a human observer.

Figure 10A:
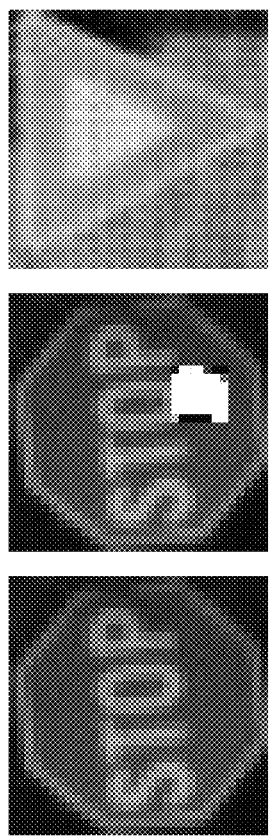
FIGS. 10A and 10B illustrate examples of an ROA attack on a traffic sign in accordance with one or more embodiments of the disclosure.
Figure 10B:
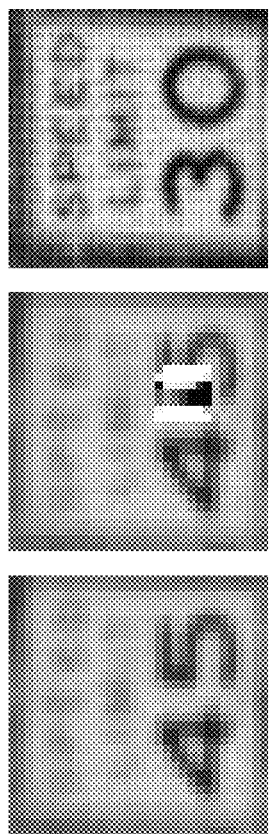

FIGS. 10A and 10B illustrate examples of an ROA attack on a traffic sign in accordance with one or more embodiments of the disclosure. In this example a rectangle of size 7×7 is used. In FIG. 10A, the original speed limit sign is shown in the first panel, the second panel shows modified input image (ROA superimposed on the sign), and the third panel shows an image of the predicted speed limit 30 sign that is output by a classifier not trained according to this disclosure when the adversarial input in the middle image is classified. In FIG. 10B, the first panel shows an original stop sign, the second panel shows a modified input image (ROA superimposed on the sign), and the third panel shows an image of the predicted Yield sign that is output by a classifier not trained according to this disclosure when the adversarial input in the middle image is classified.

Figure 11:
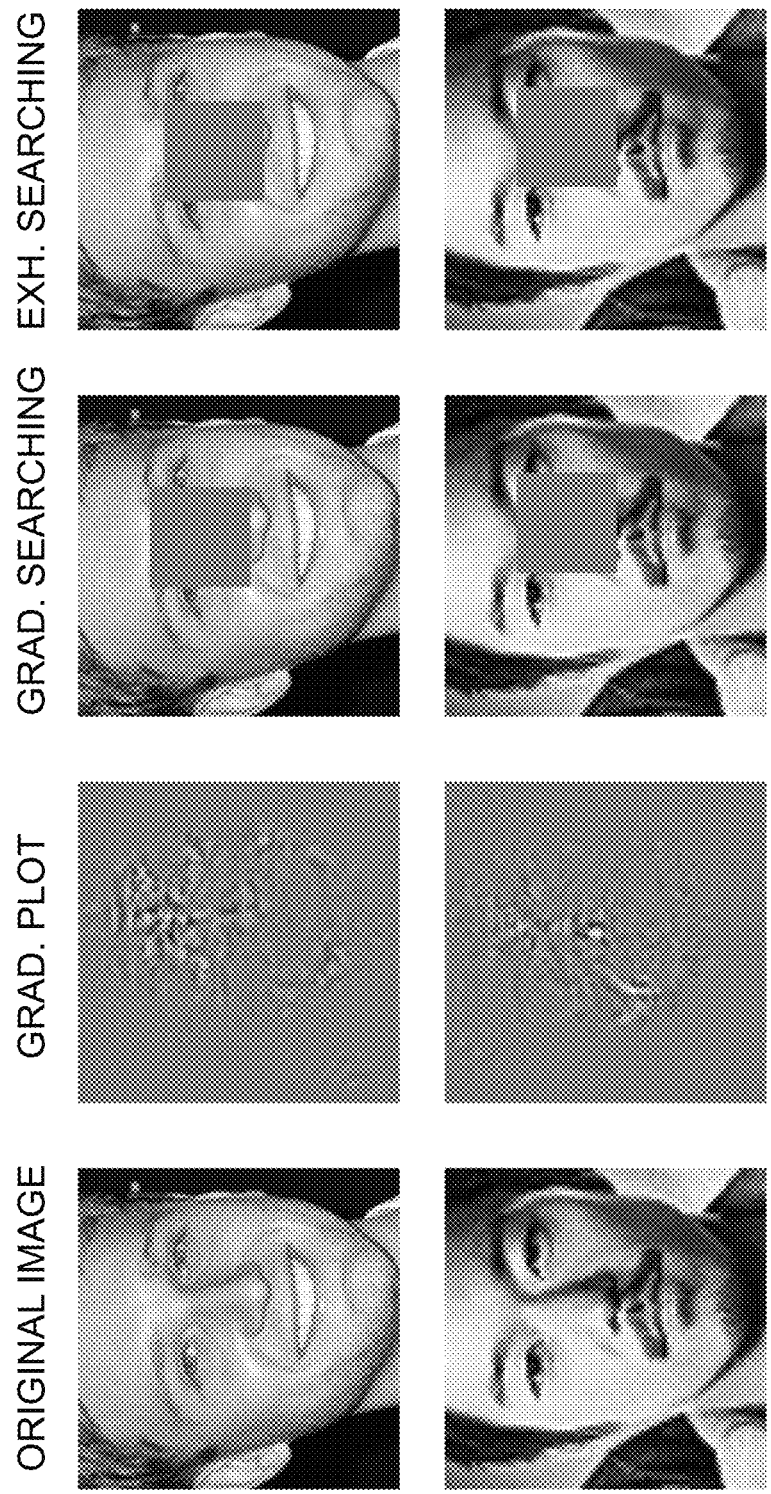
FIG. 11 illustrates examples of different search techniques in accordance with one or more embodiments of the disclosure.

FIG. 11 illustrates examples of different search techniques in accordance with one or more embodiments of the disclosure. For example, FIG. 11 shows an original input image, a plot of input gradient, a face with ROA location identified using gradient-based search, and a face with ROA location identified using exhaustive search. Each row shows a different example.

Figure 12B:
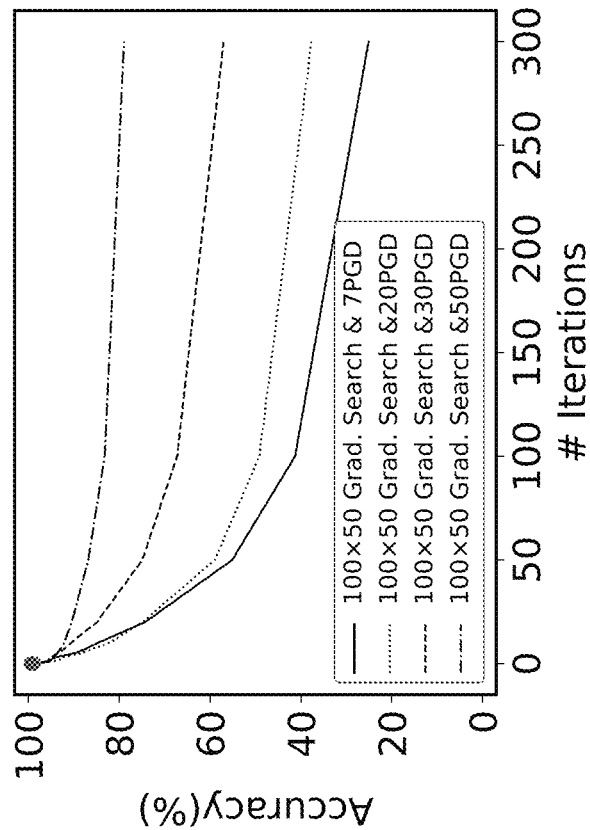
FIGS. 12A and 12B illustrate effectiveness of DOA using the gradient-based method in accordance with one or more embodiments of the disclosure.
Figure 12A:
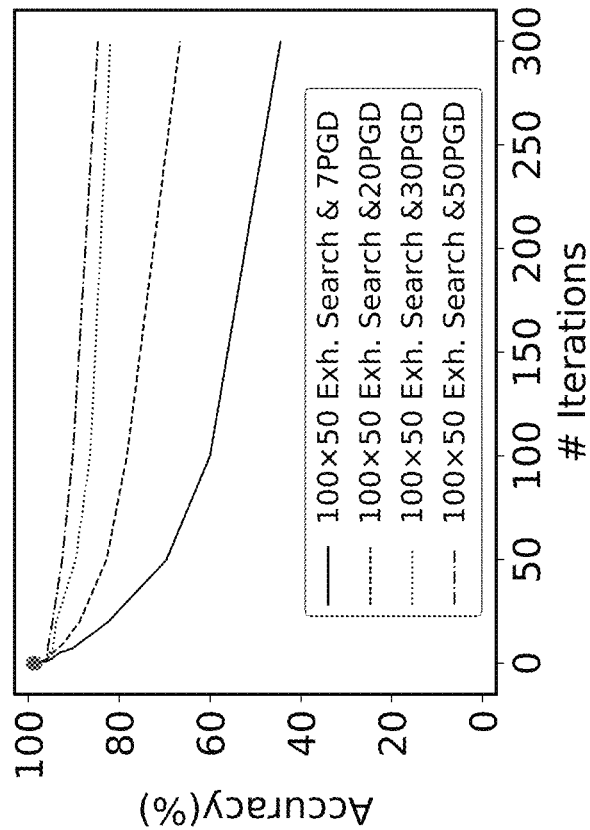

FIGS. 12A and 12B compare the effectiveness of DOA using the gradient-based method and the exhaustive search method in accordance with one or more embodiments of the disclosure. FIGS. 12A and 12B illustrate the results using a 100×50 region against the eyeglass frame attack, varying the number of PGD iterations for adversarial perturbations inside the rectangle. FIG. 12A illustrates results using an exhaustive search. FIG. 12B illustrates results using gradient-based search. As can be seen, the gradient-based method yields lower, but comparable, accuracy to the exhaustive search method. However, the gradient-based method may require less time and incur a significantly lower processor burden.

Figure 13B:
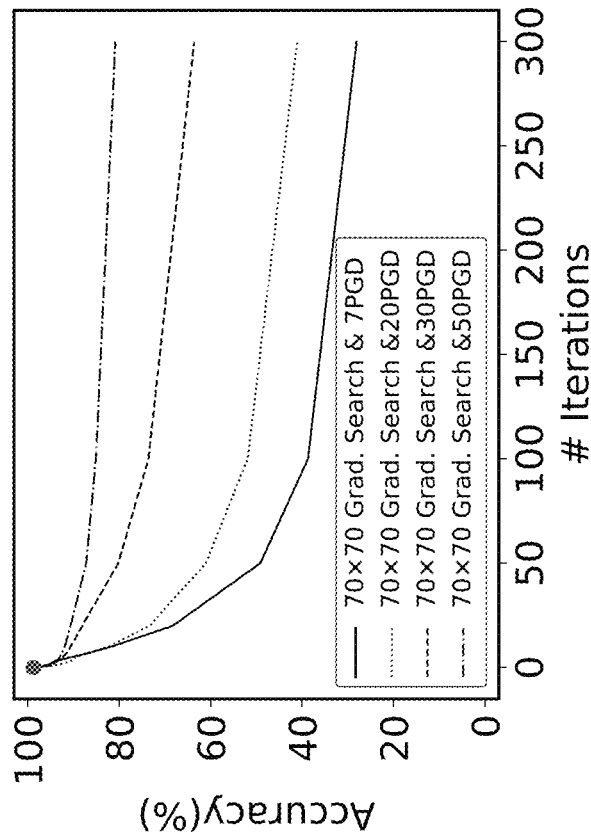
FIGS. 13A and 13B illustrate effectiveness of DOA using the gradient-based method in accordance with one or more embodiments of the disclosure.
Figure 13A:
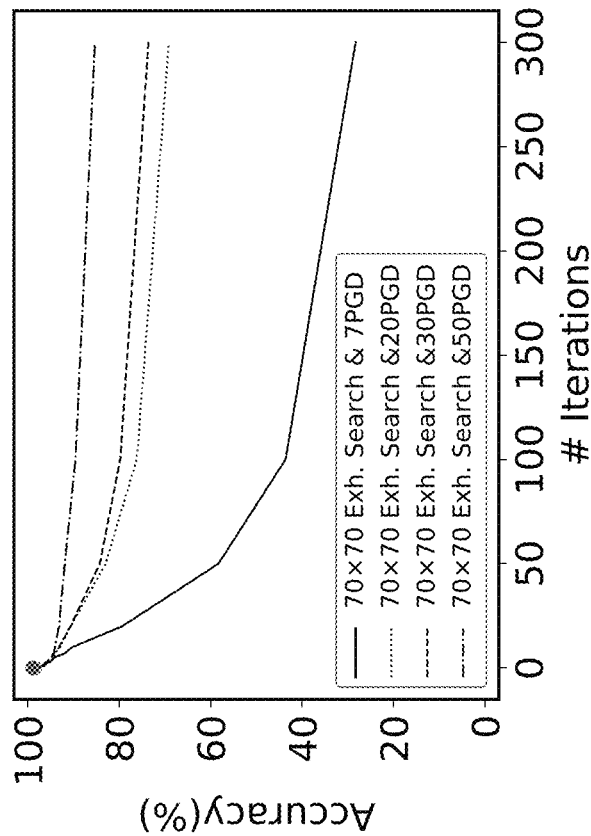

FIGS. 13A and 13B compare the effectiveness of DOA using the gradient-based method and the exhaustive search method in accordance with one or more embodiments of the disclosure using a different size occlusion. FIGS. 13A and 13B illustrate the results using a 70×70 region against the eyeglass frame attack, varying the number of PGD iterations for adversarial perturbations inside the rectangle. FIG. 13A illustrates results using an exhaustive search. FIG. 13B illustrates results using gradient-based search.

Figure 14:
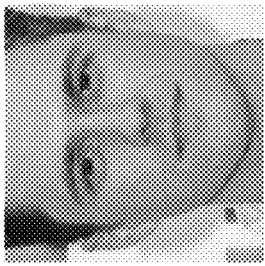
FIG. 14 illustrates examples of an eyeglass attack on facial recognition in accordance with one or more embodiments of the disclosure.

FIG. 14 illustrates examples of an eyeglass attack on facial recognition in accordance with one or more embodiments of the disclosure. FIG. 14 illustrates from left to right: 1) the original input image, 2) image with adversarial eyeglass frames, 3) face predicted by a model generated through conventional adversarial training, 4) face predicted by a model generated through conventional randomized smoothing, and 5) face predicted (correctly) by a model generated through DOA. Each row illustrates a separate example.

Figure 15:
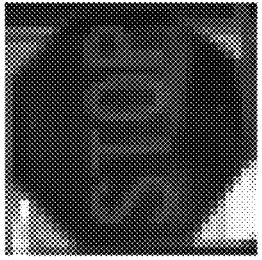
FIG. 15 illustrates examples of a stop sign attack in accordance with one or more embodiments of the disclosure.

FIG. 15 illustrates examples of a stop sign attack in accordance with one or more embodiments of the disclosure. FIG. 15 illustrates from left to right: 1) the original input image, 2) image with adversarial imaging, 3) sign predicted by a model generated through conventional adversarial training, 4) sign predicted by a model generated through conventional randomized smoothing, and 5) sign predicted (correctly) by a model generated through DOA. Each row illustrates a separate example.

Example Method for Defending Against Physically Realizable Attacks

Figure 16A:
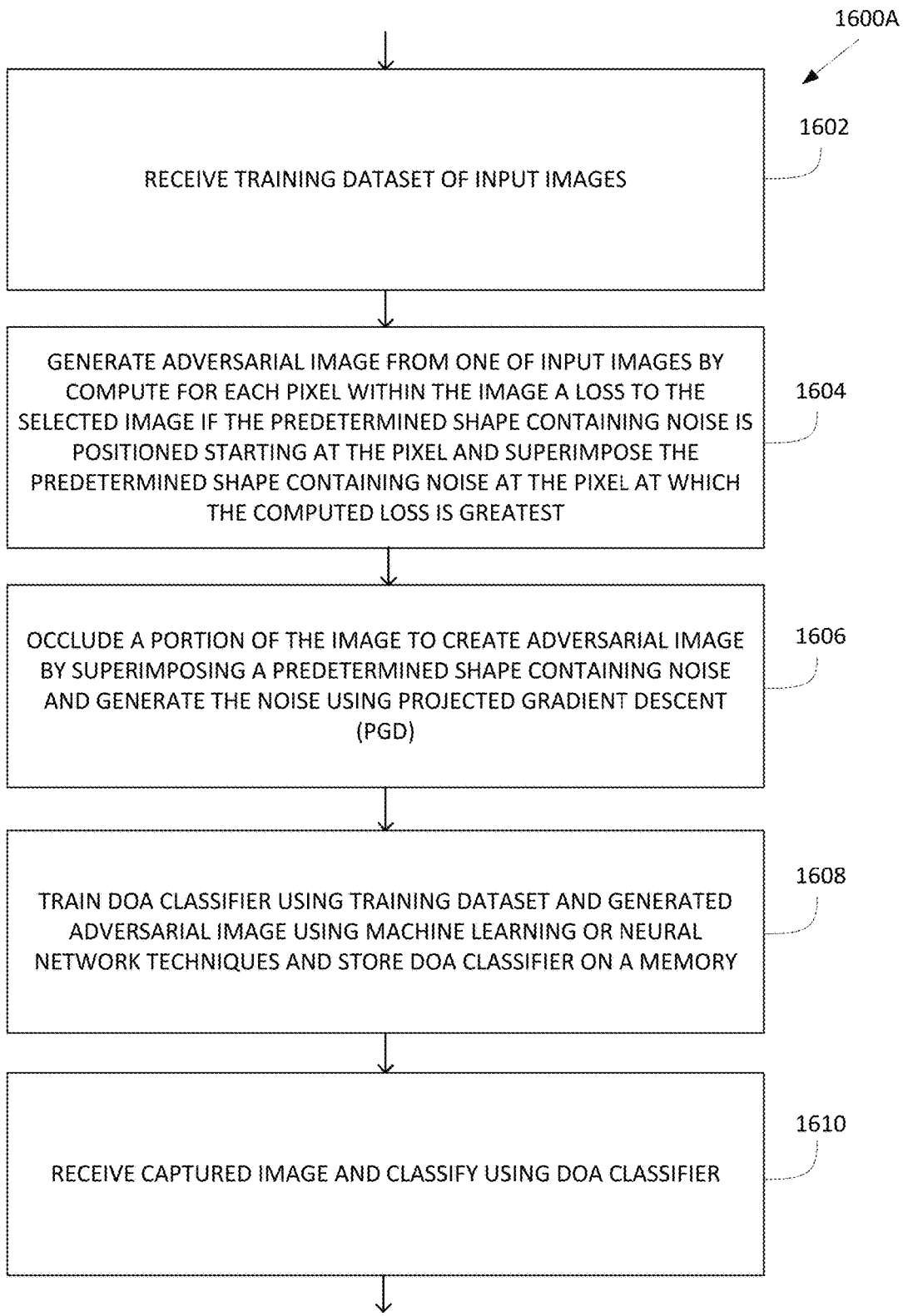
FIGS. 16A and 16B illustrate exemplary processes 1600A and 1600B for image classification implemented by the IC system illustrated in FIG. 1.
Figure 16B:
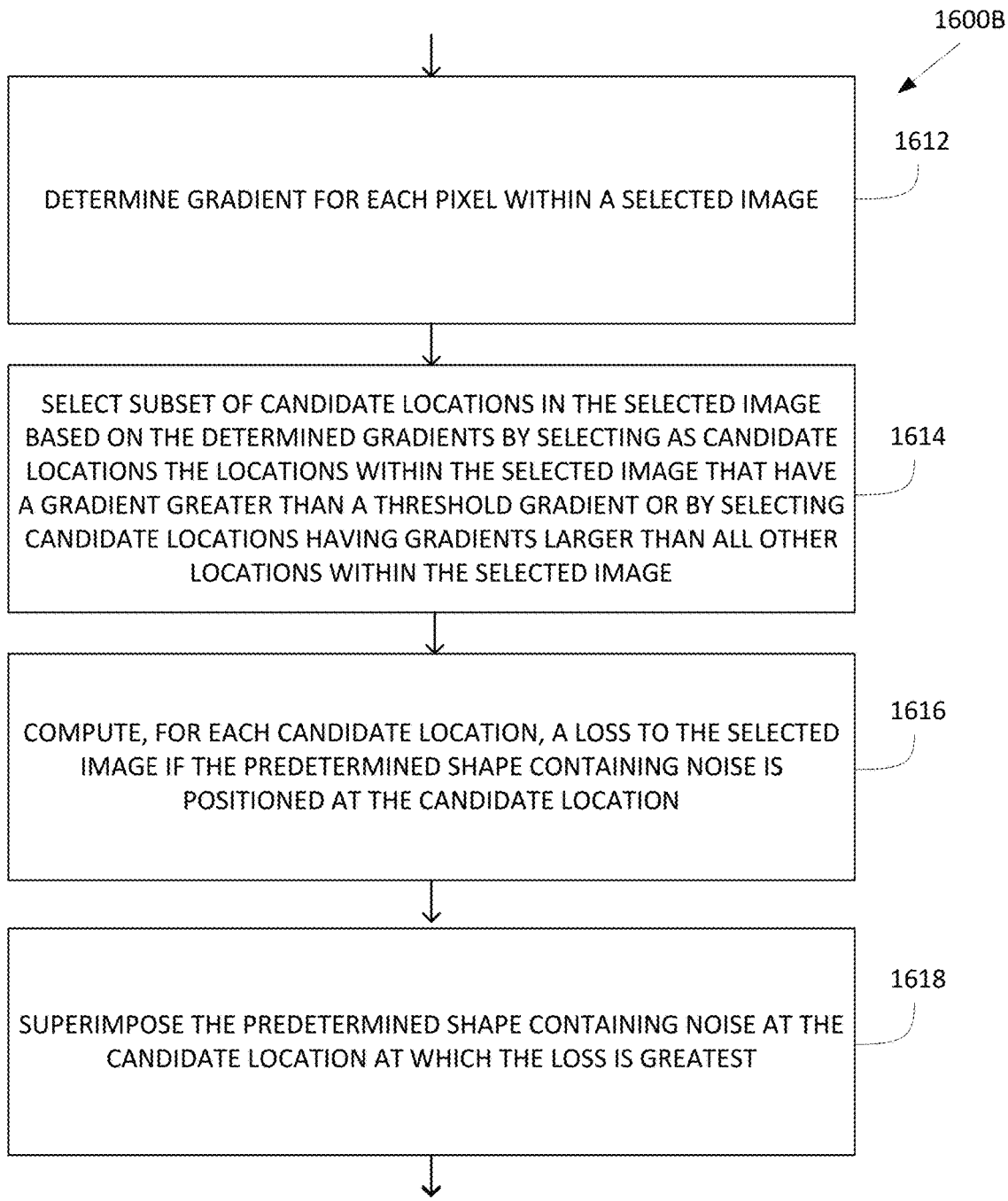

FIGS. 16A and 16B depict example processes 1600A and 1600B for performing one or methods by the IC computing device and system. Methods 1600A and 1600B may be performed by IC computing device 102 (shown in FIG. 1). The trained model may be stored within a storage device associated with IC computing device 102, such as database 106.

Method 1600A includes receiving 1602 a training dataset of input images. In some embodiments, the dataset may be received from an external user or loaded from a storage device, such as database 106, for example. As described herein, method 1600A may further include generating 1604 an adversarial image from one of the input images from the training dataset. In some embodiments, the adversarial image may be generated by computing, for each pixel within the image, a loss to the selected image if a predetermined shape containing noise is positioned starting at the pixel and superimposing the shape containing noise at the pixel at which the computed loss is greatest. In some embodiments, the predetermined shape may be a rectangle. Alternatively, the predetermined shape may be, for example, a square, an oval, a circle, a polygon, or the like. Method 1600A further includes the step to occlude 1606 a portion of the image to create the adversarial image by superimposing the predetermined shape containing noise and generate the noise using projected gradient descent (PGD).

Method 1600A further includes training 1608 a classifier, such as a defense against occlusion attacks (DOA) classifier. The classifier may be trained using the aforementioned training dataset and the generated adversarial image. Additionally, or alternatively, the classifier may be trained using machine learning and/or neural network techniques described herein. In some embodiments, the classifier may be stored on a memory or other type of storage device. For example, IC computing device 102 may store the trained classifier on database 106 (shown in FIG. 1). Subsequently, method 1600A may further include receiving 1610 a captured image and classifying the image using the trained classifier. In some embodiments, the captured image may be captured by a user via a portable device (e.g., camera-equipped cell phone), a dashcam installed on a vehicle, a security camera, or the like.

Method 1600B may be performed by a computing device, such as IC computing device 102 of FIG. 1, for generating an adversarial image. For example, method 1600B includes determining a gradient for each pixel within a certain image. Method 1600B further includes selecting 1614 a subset of candidate locations in the selected image based on the determined gradients. This may be done by selecting as candidate locations the locations within the selected image that have a gradient greater than a threshold gradient. Alternatively, subset candidate locations may be selected by determining candidate locations having gradients larger than all other locations within the selected image.

Method 1600B may further include computing 1616, for each candidate location, a loss to the selected image if the predetermined shape containing noise is positioned at the candidate location. Finally, method 1600B may further include superimposing 1618 the predetermined shape containing noise at the candidate location at which the loss is greatest.

A detailed description of a process for computing a rectangular occlusion attack is herein described. Computing rectangular occlusion attack (ROA) proceeds through the following two steps: 1) iterate through possible positions for the rectangle's upper left-hand corner point in an image. Find the position for a grey rectangle (RGB value=[127.5, 127.5, 127.5]) in the image that maximizes loss. 2) Generate high-$\in$ $l\infty$ noise inside the rectangle at the position computed in step 1.

The process proceeds by identifying the ROA position, which amounts to exhaustive search through the image pixel region. The process may include several parameters. For example, images are squares with dimensions $N^2$; a stride parameter S (i.e. make location computation faster by only considering every other Sth pixel during the search, or skip S pixels each time). For implementation of ROA attacks, stride parameter may be set to S=5 for facial recognition and S=2 for traffic sign classification, for example. Using the tunable stride parameter, the search for the best location for ROA may entail a large number of loss function evaluations, which may be costly, since each such evaluation means a full forward pass through the deep neural network, and these costs may add up quickly. To speed things up, the magnitude of the gradient of the loss as a measure of sensitivity of particular regions to manipulation may be used. Specifically, compute a gradient $\nabla L$, and let $\nabla Li$ be the gradient value for a particular pixel i in the image. Next, iterate over the possible ROA locations, but for each location compute the gradient of the loss at that location corresponding to the rectangular region. This may be done by adding squared gradient values $(\nabla Li)^2$ over pixels i in the rectangle. Use of this approach to find the top C candidate locations for the rectangle may be used. Finally, for each of these, compute the actual loss for each location, to find the position of ROA. Once this place for the rectangle is found, the next step is to introduce adversarial noise inside it. For this, the $l\infty$ version of the PGD attack is used, restricting perturbations to the rectangle. Further, {7, 20, 30, 50} iterations of PGD may be used to generate adversarial noise inside the rectangle, and with learning rate $\alpha$={32, 16, 8, 4} correspondingly.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, audio and/or video records, text, and/or actual true or false values. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

As described above, the systems and methods described herein may use machine learning, for example, for image classification. That is, machine learning algorithms may be used by IC computing device 102, for example, to identify certain image patterns and prevent future image occlusion attacks. Accordingly, the systems and methods described herein may use machine learning algorithms for both image classification, recognition and predictive modeling.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

In some embodiments, registration of users for the TA system includes opt-in informed consent of users to data usage consistent with consumer protection laws and privacy regulations. In some embodiments, the collected data may be anonymized and/or aggregated prior to receipt such that no personally identifiable information (PII) is received. In other embodiments, the system may be configured to receive registration data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals, or may make use of such personal information, the individuals may be provided with an opportunity to control whether such information is collected or to control whether and/or how such information is used. In addition, certain data may be processed in one or more ways before it is stored or used, so that personally identifiable information is removed.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An image classification (IC) computing system for defending against physically realizable attacks, the IC computing system comprising at least one processor in communication with at least one memory device, wherein the at least one processor is programmed to:
retrieve, from the at least one memory device, a training dataset of one or more input images, each input image including a real-world object to be identified;
generate at least one adversarial image from a selected image from the training dataset of one or more input images by:
selecting a location on the selected image; and
generating adversarial noise inside a predetermined shape positioned at the selected location using projected gradient descent (PGD), wherein the predetermined shape with the generated adversarial noise occludes a portion of the real-world object to be identified;
train a classify images classifier to by identifying the real-world object in images, wherein the classifier is trained using the training dataset and the generated at least one adversarial image; and
store the trained classifier in the at least one memory device.

2. The IC computing system of claim 1, wherein the processor is further programmed to:
receive, from an external device, at least one captured image;
classify the at least one captured image using the stored trained classifier.

3. The IC computing system of claim 1, wherein the predetermined shape comprises a fixed-dimensional rectangle.

4. The IC computing system of claim 1, wherein the processor is programmed to select the location on the selected image by:
determining a gradient for each pixel within the selected image;
selecting a subset of candidate locations in the selected image based on the determined gradients;
computing, for each candidate location, a loss to the selected image if the predetermined shape containing noise is positioned at the candidate location; and
selecting the candidate location at which the loss is greatest as the selected location.

5. The IC computing system of claim 4, wherein the processor is programmed to select the subset of candidate locations in the selected image based on the determined gradients by selecting as candidate locations the locations within the selected image that have a gradient greater than a threshold gradient.

6. The IC computing system of claim 4, wherein the processor is programmed to select the subset of candidate locations in the selected image based on the determined gradients by selecting as candidate locations N locations within the selected image having gradients larger than all other locations within the selected image, where N is a predetermined positive integer.

7. The IC computing system of claim 1, wherein the processor is programmed to select the location on the selected image by:
computing, for each pixel within the selected image, a loss to the selected image if the predetermined shape with the generated adversarial noise is positioned starting at the pixel; and
selecting the pixel at which the computed loss is greatest as the selected location.

8. The IC computing system of claim 1, wherein the trained classifier is built using machine learning or neural network techniques.

9. A computer implemented method for defending against physically realizable attacks, the computer implemented method comprising:
receiving a training dataset of one or more input images, each input image including a real-world object to be identified;
generating at least one adversarial image from a selected image from the training dataset of one or more input images by:
selecting a location on the selected image; and
generating adversarial noise inside a predetermined shape positioned at the selected location using projected gradient descent (PGD), wherein the predetermined shape with the generated adversarial noise occludes a portion of the real-world object to be identified;
training a classifier to classify images by identifying the real-world object in images, wherein the classifier is trained using training dataset and the generated at least one adversarial image; and
storing the trained classifier in least one memory device.

10. The computer implemented method of claim 9, further comprising:
receiving, from an external device, at least one captured image; and
classifying the at least one captured image using the stored trained classifier.

11. The computer implemented method of claim 9, wherein the predetermined shape comprises a fixed-dimensional rectangle.

12. The computer implemented method of claim 9, wherein selecting the location on the selected image comprises:
determining a gradient for each pixel within the selected image;
selecting a subset of candidate locations in the selected image based on the determined gradients;
computing, for each candidate location, a loss to the selected image if the predetermined shape with the generated adversarial noise is positioned at the candidate location; and
selecting the candidate location at which the loss is greatest as the selected location.

13. The computer implemented method of claim 12, wherein selecting the subset of candidate locations in the selected image based on the determined gradients comprises selecting as candidate locations the locations the selected image that have a gradient greater than a threshold gradient.

14. The computer implemented method of claim 12, wherein selecting the subset of candidate locations in the selected image based on the determined gradients comprises selecting as candidate locations N locations within the selected image having gradients larger than all other locations within the selected image, where N is a predetermined positive integer.

15. The computer implemented method of claim 9, wherein selecting the location on the selected image comprises:
- computing, for each pixel within the selected image, a loss to the selected image if the predetermined shape with the generated adversarial noise is positioned starting at the pixel; and
- selecting the pixel at which the computed loss is greatest as the selected location.

16. A computer readable media storing non-transitory instructions that, when executed by a processor, program a processor to:
- receive a training dataset of one or more input images, each input image including a real-world object to be identified;
- generate at least one adversarial image from a selected image from the training dataset of one or more input images by:
  - selecting a location on the selected image; and
  - generating adversarial noise inside a predetermined shape positioned at the selected location using projected gradient descent (PGD), wherein the predetermined shape with the generated adversarial noise occludes a portion of the real-world object to be identified;
- train a classifier to classify images by identifying the real-world object in images, wherein the classifier is trained using the training dataset and the generated at least one adversarial image; and
- store the trained classifier in least one memory device.

17. The computer readable media of claim 16, wherein the instructions further program the processor to select the location on the selected image by:
- determining a gradient for each pixel within the selected image;
- selecting a subset of candidate locations in the selected image based on the determined gradients;
- computing, for each candidate location, a loss to the selected image if the predetermined shape with the generated adversarial noise is positioned at the candidate location; and
- selecting the candidate location at which the loss is greatest as the selected location.

18. The computer readable media of claim 16, wherein the instructions further program the processor to select the location on the selected image by:
- computing, for each pixel within the selected image, a loss to the selected image if the predetermined shape with the generated adversarial noise is positioned starting at the pixel; and
- select the pixel at which the computed loss is greatest as the selected location.

* * * * *